May 6, 1958 R. L. WELCKER 2,833,709
ELECTROLYTIC WATER CORRECTION DEVICE
Filed Feb. 24, 1953 3 Sheets-Sheet 1

INVENTOR.
ROLAND L. WELCKER
BY
Wilkinson Mawhinney
Attorneys

May 6, 1958   R. L. WELCKER   2,833,709
ELECTROLYTIC WATER CORRECTION DEVICE
Filed Feb. 24, 1953   3 Sheets-Sheet 2

INVENTOR.
ROLAND L. WELCKER
BY
Wilkinson Mawhinney
Attorneys

May 6, 1958 R. L. WELCKER 2,833,709
ELECTROLYTIC WATER CORRECTION DEVICE
Filed Feb. 24, 1953 3 Sheets-Sheet 3
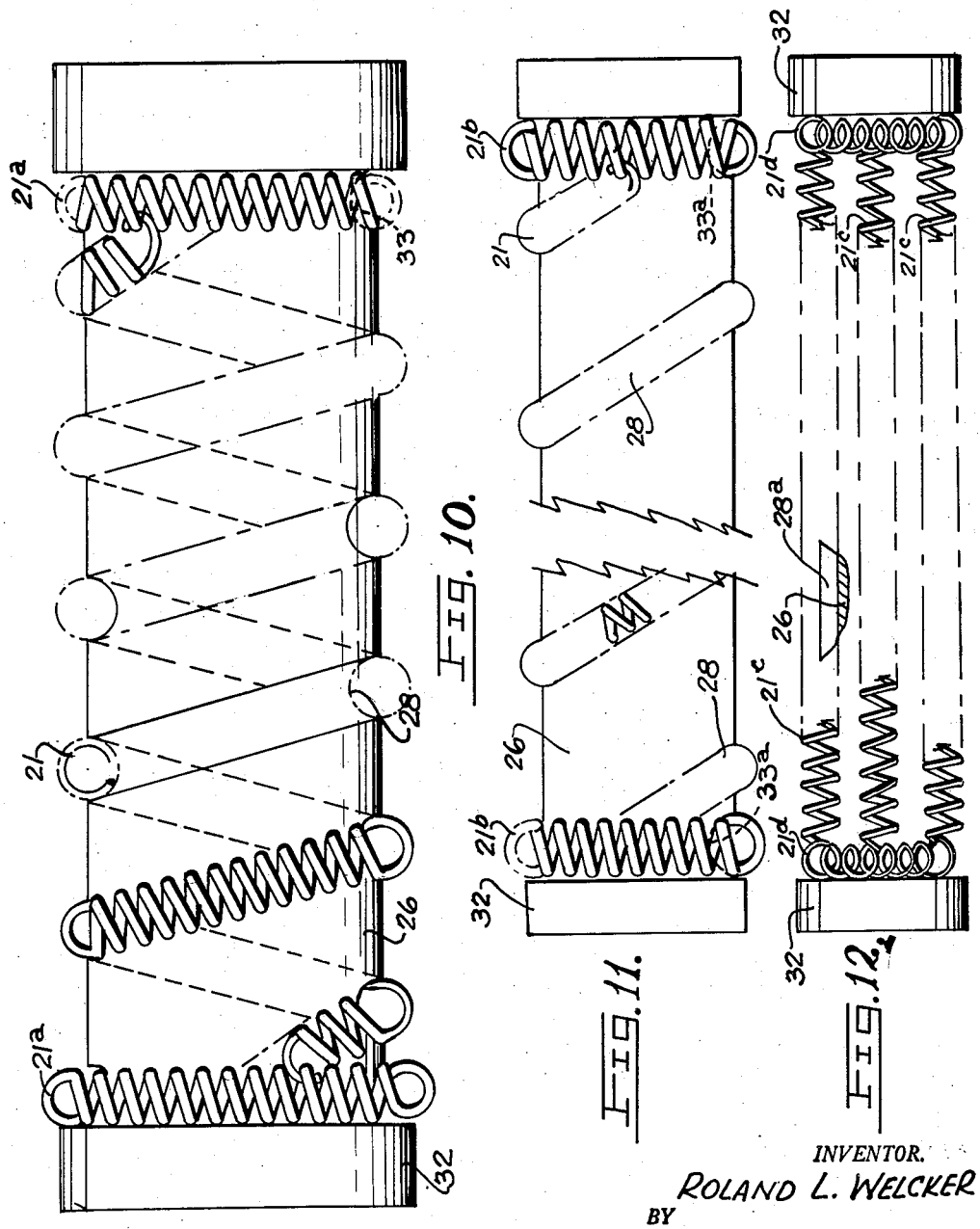
INVENTOR.
ROLAND L. WELCKER
BY

United States Patent Office 2,833,709
Patented May 6, 1958

2,833,709

ELECTROLYTIC WATER CORRECTION DEVICE

Roland L. Welcker, New Orleans, La., assignor to The Welcker Corporation, New Orleans, La., a corporation of Louisiana Application February 24, 1953, Serial No. 338,472

16 Claims. (Cl. 204—248)

The present invention relates to improvements in the method of manufacture of and electrolytic water correction devices.

An object of the present invention is to provide a water correction device for use in steam boilers, hot water generating systems and the closed aqueous cooling systems of internal combustion engines.

It has long been known that when two different metals in the electrolytic series are in contact with one another and the two submerged in an electrolyte, for example water, they function as a galvanic cell, the more active material becoming the anode where oxidation takes place and the less active material becoming the cathode where reduction takes place.

The development of such a correction device, as set forth above, may be broken down into three phases, the first of which is the selection of an anode of suitable material, secondly the selection of a cathode with a suitable surface material or as a solid cathode and thirdly, the manner in which the anode and cathode are brought into contact. The goal to be attained is the achievement of a unit cell that functions efficiently to establish anode and cathode half cell reactions for the life of the expendable anode.

The anode half cell reaction controls the oxidation of the anode material and the liberation of the trapped and alloyed materials in the anode into the electrolyte.

The cathode half cell reaction controls the reduction of material which is not directly a part of the galvanic cell construction. The raw materials for the cathode half cell reaction come from the electrolyte or in some instances can be the electrolyte. In aqueous electrolytes the raw material can be the hydrogen ion, hydroxyl ion, oxygen, or water.

The prior art has employed a cathode consisting of one solid wire helically wound about the anode. To vary the size area of the cathode, only two variables have been heretofore available. They are the pitch or lead of a single helix or the cross-sectional area of the wire employed. In many instances, fine lead of a single helix is limited because circulation space for the electrolyte is needed so that the anode products will not be trapped, which may result in the accumulation, bridging and eventual log gamming of galvanic cell products between successive coils of the solid spring single helix cathode of the prior art. The only variable left is the size of the wire; it has been heretofore advantageous to use a wire of sizes as large as No. 5 B. & S. copper alloy wire which is very expensive, very difficult to handle and wind and only the surfaces being used while the center metal in the spring is not conserved. When employing such large sizes of wire in the present art, terrific forces must be applied to the wire through the coiling point of the spring winding machine so that the surface of the wire is deformed by the coiling point tool. Also the wire being so large and highly tempered, the operation of making the spring is such that one spring is made at a time, the cutting tool of the spring machine severs the formed spring from the continuous wire. This classifies the operation as stepwise and not continuous. These individual springs are then sent to finishing such a solvent bath, electrolytic cleaning or then plated as necessary.

During the life of the anode, while functioning as a working galvanic cell, the anode material is eaten away between the junction points of cathode and anode. Simultaneously there is a physical change in the anode. This change in the anode is outwardly visible by its elongation and swelling. With some anode alloys the cathode is known to double its initial length. For example, a five inch anode would elongate to ten inches. This stretching out has no particular pattern, sometimes it snakes out in an arch and sometimes elongates in a straight line. It is to be appreciated that this distortion of the anode must be given appreciable weight in designing the construction of the anode.

In the present art, during the early stages of decomposition of the anode it is known that there is not only an elongation but also a slight perceptible swelling of the anode. Therefore, in the first stages of anode life any change in length is attended by a corresponding stretching of the cathode wire. After the galvanic cell has functioned for a while, there is a bonding action between the interfaces of the anode and cathode. This bonding is by no means comparable to welding, or as strong, but exists and strong enough that there is no slippage between the anode and cathode. In this anode swelling and elongation, spring resisting forces of the cathode are exerted on the anode. Where the cathode is of a large diameter wire the forces exerted are great enough to shear or crumble the anode. When the anode has decomposed to a point where it is greatly weakened the single spring has been known to break the junction between the solid anode portion remaining and the cathode. A single spring cathode with the contact as a continuous spiral line about the anode presents enough moment and in such a way that the contractile force of the spring is directed radially inwardly through the anode.

If the diameter of the wire forming the cathode is very large the forces set up between the anode and cathode during the swelling of the anode are sufficient to break the cathode and in many instances thereby permitting dislodgement of the anode from within the confines of the cathode.

I have provided a solution to the foregoing problems in that the cathode produced in accordance with my process is made in the form of a helix, the defined or inner included portion of which never contacts the anode and in which each convolution permits the passage of electrolyte through the helix and which also places, due to the helical construction, more cathode material in sight of the anode. By such construction the following advantages are attained. The cathode may be manufactured from a relatively light material and its manufacture may be in the form of a continuous process. The cathode material may be of any suitable or obtainable shape, for instance round or rectangular. Wire or ribbon can be used by employing the helical form of the cathode material, and by winding the cathode about the anode in a serpentine manner, a more efficient positioning of cathode to anode is obtained. Any particular shape of wire or ribbon may be employed to give any desired surface area of cathode.

A serpentine of a helix allows conformation of the cathode not only longitudinally about the anode but also diametrically thereabout. The cathode constructed as a helix and wound in a serpentine manner about the anode grips the anode at all times but no large stresses are applied either to the cathode or anode, this being that due to the helical construction of the cathode the initial expansion due to the swelling of the anode will be permitted.

The conforming characteristics of a helical cathode permit of a wide selection of anode shape. Cathode materials are so inexpensive that they can be thrown away after use and no large amount of scarce material will be scrapped.

The electrochemical properties which govern the actions of water correction devices of this character cause the device to act as a galvanic couple when immersed in an aqueous electrolyte. The negative or anode element is electrochemically released into the water to produce ions that immediately combine with water to give hydrated metallic ions and metallic hydroxides. These ions may eventually become insoluble metallic hydroxides. The calcium and magnesium ions present in the water are entrained or complexed with either the hydrated ions or by the metallic hydroxides. The result is that a soft sludge is formed rather than the usual hard adherent scale that builds up on heat transferent surfaces when used with untreated or hard water.

With the foregoing and other objects in view, the invention will be more fully described hereinafter, and will be more particularly pointed out in the claims appended hereto.

In the drawings, wherein like symbols refer to like or corresponding parts throughout the several views:

Figure 10 is a side elevational view with parts broken away of another form of the present invention;

Figure 11 is a side elevational view with parts broken away showing a further form of the invention; and Figure 12 is a side elevational view of a still further form of the present invention.

Figure 1:
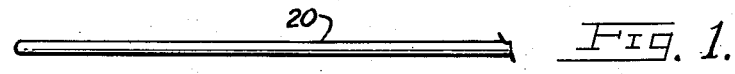
Figure 1 is a side elevational view of a section of wire from which the cathode is formed in accordance with the present invention.
Figure 2:
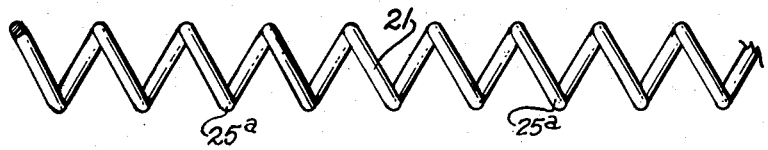
Figure 2 is a side elevational view with parts broken away showing a helix which constitutes the cathode in the present invention.
Figure 2A:
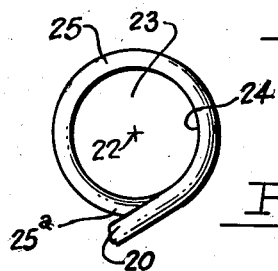
Figures 2A is a section taken on an enlarged scale through one of the helices shown in Figure 2.

Referring more particularly to the drawings, 20 (Figure 1) denotes a length of cathode wire which is wound into a helix 21 (Figure 2). The helix 21 is generated about an axis 22 (Figure 2A). This helical cathode 21, for purposes of definition, referring more particularly to Figure 2A, comprises an inner included area or space 23 and the portions of the helices surrounding this inner included area are designated as inner surfaces 24 while the outer surfaces of the helical cathode are designated generally as 25. The helical cathode 21 is made up of a continuous series of convolutions 21ᶜ (Figure 12), the lead of the convolutions being variable from a fine to a coarse pitch. This helical cathode may be tempered to impart any desired degree of resiliency to the helix. In the formation of the cathode, the same may be formed on a conventional spring winding machine and produced in a continuous process, namely making more than the amount necessary for a single electrolytic correction device. The wire 20 is formed into the helices 21 on a spring winding machine. The spring from the machine is continuous and is fed onto a spindle where the serpentine is formed.

Figures 4, 5:
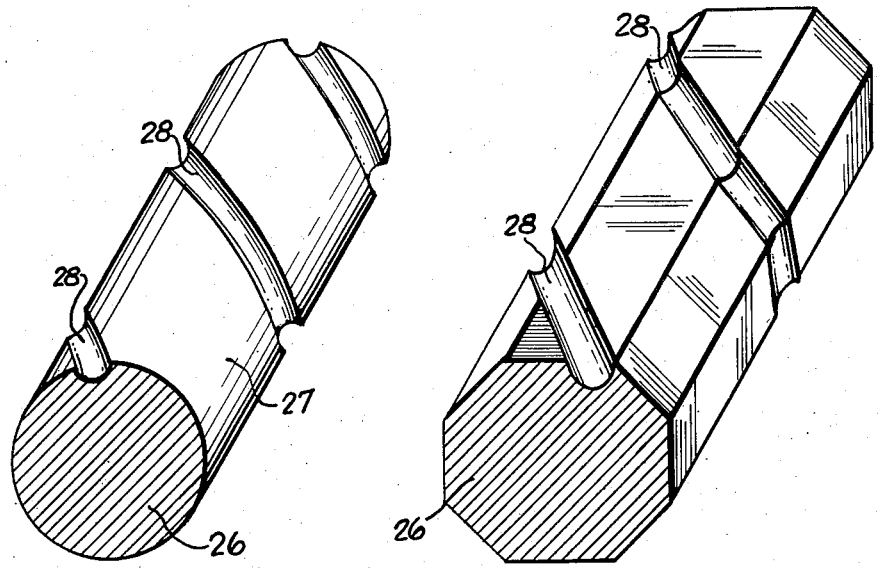
Figure 4 is a fragmentary perspective view with parts shown in section of a circular form of anode employed with the present invention.
Figure 5 is a perspective view with parts broken away showing another form of anode which may be employed in accordance with the present invention.

The anode 26 may be of any suitable geometrical form ranging from forms derivative from a circle in Figure 4 to an N-shaped polygon illustrated in Figure 5. The anode 26 may be provided over its external surface 27 with a groove 28. This groove 28 may be serpentine as shown in Figures 4 and 5 or may be a straight groove the axis of which is substantially parallel to the longitudinal axis of the anode 26, thereby producing the form of the invention shown in Figure 12. The grooves are present for positioning and definitely setting the pitch of the serpentine and secondly by regulating the depth of the groove, the contact area between anode and cathode can be controlled for any pitch setting.

In the illustrated constructions a contact point 25ᵃ on the exterior surface 25 of each helical convolution 21ᶜ is placed either in free sliding contactual electrophysical engagement with the exterior surface 26ᵃ of the anode 26 or in sliding contactual engagement having portions of which lie within the groove 28 of the anode 26. The depth of the groove 28 may be varied to regulate the degree of contact between the anode 26 and the helix 21, such depth varying the surface contact area between the outer surfaces 25 of the helical convolutions 21ᵃ of anode helix 21 and the anode 26.

The cathode helix 21 may be wrapped in a serpentine about the anode 26. The axis of generation of the serpentine is separate and distinct from the axis 22 of the helix 21.

The materials from which the cathode may be made are designated generally as positive materials and by way of example only, one specific form of such material is copper. The material from which the anode may be made is designated generally as negative material and by way of example may be magnesium, aluminum or zinc.

The term "positive" is applied to materials below hydrogen in the electrode-potential series and the term "negative" is applied to materials above hydrogen in the electrode-potential series.

Figure 3:
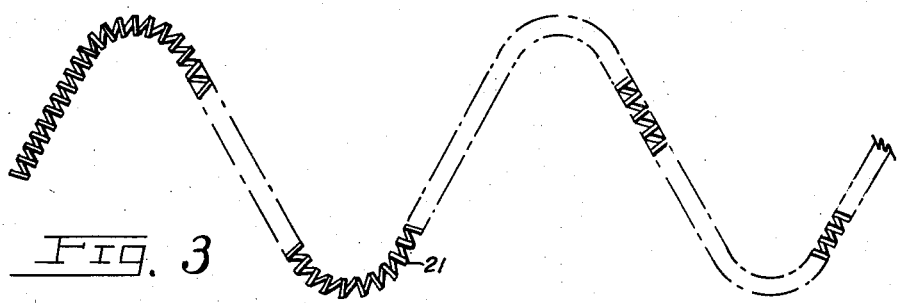
Figure 3 shows the helical cathode of Figure 2 in a serpentine winding in accordance with the present invention.
Figure 6:
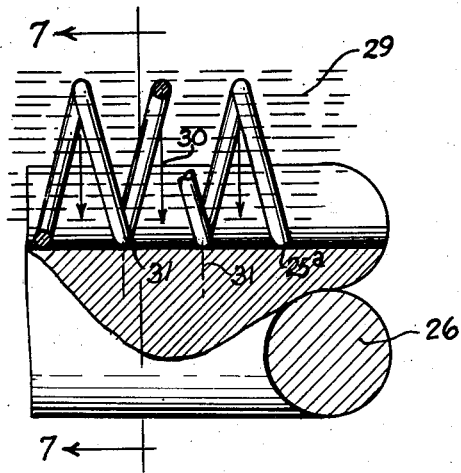
Figure 6 is a side elevational view with parts broken away and parts shown in section of one form of the invention immersed in an electrolyte.
Figure 7:
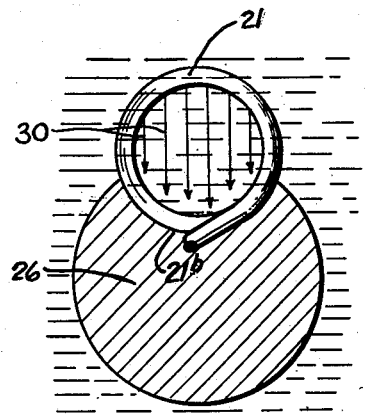
Figure 7 is a vertical section taken on the line 7—7 in Figure 6.

In placing the helical cathode 21 in contact with the anode 26, either directly upon its surface 26ᵃ or partially within the groove 28 in either the serpentine winding of Figures 3 and 10 or the straight line helix of Figure 12 the following particular advantage is gained from the helical construction of the cathode. As illustrated particularly in Figures 6 and 7, due to the lead of the convolutions 21ᶜ of the helix 21 the major portion of the inner surface 24 of each convolution 21ᶜ is in electrochemical sight of the anode material 26. The area of sight is somewhat less than the surface area of the interior or inner surface 24 of each convolution due to the contact area 25ᵃ of the outside portions 25 of each convolution 21ᶜ. This construction of helical cathode permits the electrolyte to enter and flow across the inner included surface of the cathode helix or more specifically the inner surfaces 24 of the convolutions 21ᶜ. This permits the ion flow between anode and cathode to be accelerated thereby increasing the effectiveness of the device in prohibiting the formation of hard scale deposits from the water on the heat transferent surfaces. The sighting referred to hereinabove is illustrated in Figures 6 and 7 by the arrows 30.

It will be appreciated that the actual contact surface between the anode and cathode may be increased or decreased by either increasing or decreasing (a) the lead or pitch of the helices of the cathode helix 21 or (b) varying the pitch or lead of the serpentine winding of the cathode helix 21 about the anode 26. The instant cathode design utilizes both interior and exterior surfaces and with both surfaces being accessible to electrolyte circulation.

A distinct advantage is obtained physically as well as electrochemically by providing a serpentine winding of a helical cathode for the reason that during the initial stages of reaction between anode and cathode in the presence of an electrolyte as the anode swells and elongates the same may be followed or compensated for by the spring action obtained from the helical winding of the cathode. Thereby there is no resultant crumbling of anode material or undue stresses imposed upon the cathode winding which could possibly result in a breaking of either.

Figure 8:
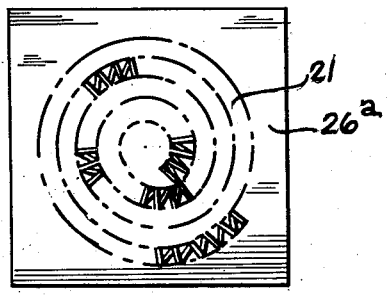
Figure 8 is a top plan view of one form of the invention.
Figure 9:
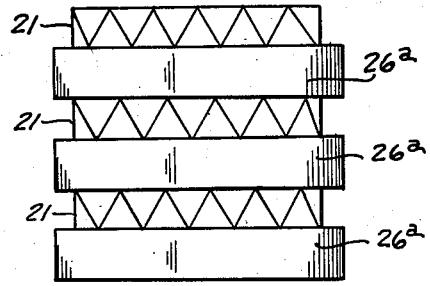
Figure 9 is a side elevational view of the form of invention shown in Figure 8.

Referring more particularly to Figure 8, a form of the invention is shown in which the helical cathode 21 is wound in an involute and placed upon an anodic plate 26ª. This construction defines a unit cell, however, several laminations of the unit cell may be assembled as illustrated in Figure 9 to generate any predetermined amount of chemical reaction deemed appropriate for an aqueous electrolyte and capacity of system.

Referring more particularly to Figure 10, another form of the invention is shown in which the anode 26 is provided with end abutments 32 of a diameter greater than that of the anode 26. It is to be noted that proximate the abutments the serpentine groove 28 of the anode communicates with end annular grooves 33 for accommodating portions of the helix 21 in substantially annular end bands 21ª. These end bands 21ª may be employed to adjust the tension along the serpentine of the helix 21 to any desired value thereby under expansion or contraction as appropriate extending or diminishing the lead or pitch of the helix or for merely taking slack out of the helix. This is attained by opposite rotation of the end bands 21ª.

Referring more particularly to Figure 11, a further form of the invention is shown in which the anode 26 is provided with end abutments 32 and with a serpentine groove 28 terminating at both ends of the anode 26 in annular grooves 33ª. In this form of the invention the annular end helical bands of cathode material 21ᵇ are of a greater wound diameter. The ends of the serpentine winding of the helix 21 may be engaged into the loops of the helices of these end helical bands 21ᵇ and in the manner described in Figure 10 the tension of the serpentine winding may be adjusted by opposite rotation of the end annular helical bands 21ᵇ. The reason for making these end coils of a greater diameter is that they will also serve as a support to elevate the unit cell off of tubes as in fire tube boilers.

Referring more particularly to Figure 12, a still further form of the invention is shown in which the anode 26 is provided with end abutments 32 and wherein there is provided a plurality of grooves 28ª circumferentially positioned about the anode with their axes substantially parallel to the longitudinal axis of the anode for receiving therewithin or partially therewithin lengths of the helical cathode 21ᶜ. These lengths of helices 21ᶜ are substantially uniform in length and are connected by interweaving or interlocking their terminals with annular helical end bands 21ᵈ.

Although I have disclosed herein the best form of the invention known to me at this time, I reserve the right to all such modifications and changes as may come within the scope of the following claims.

What I claim is:

1. An improved electrolytic water correction device comprising a cathode of resilient wire of a positive material wound in a coil of open coarse-lead convolutions, and an anode of negative material about which said coil is wound externally in a serpentine with the axis and included space of the coil outstanding beyond the outer surface of said anode against which successive points on the exteriors of the convolutions contact in helically spaced order to support the coil from the anode only at such spaced points, the spaced contact points of said convolutions being electrical contacts and expanding on the anode to permit of axial expansion and contraction of the coil and simultaneous expansion and contraction of the serpentine and the pitch of the helices in accompaniment to corresponding changes in size of said anode.

2. An improved electrolytic water correction device comprising an elongated anode of negative material subject to distortion and a cathode of positive material in the form of a wire wound into a helix wound in a serpentine about said anode with the axis of said serpentine substantially coinciding with the longitudinal axis of said anode and the axis and included space of the helix lying completely outside the surface of said anode and with the convolutions of said helix touching on the surface of said anode in electrical contact therewith at spaced points on the exterior only of said helix to permit of axial expansion and contraction of said helix to accommodate diametric enlargement and diminution of said serpentine incident to changes in the form of the mass of said anode.

3. An improved electrolytic water correction device comprising an anode of negative material having a groove on its external surface, and a helical cathode of positive resilient material, outer portions only of which are received within said groove and which are in stressed electrical contact with the walls of the anode groove, the inner surfaces defined within the convolutions of said helical cathode being out of physical contact with said anode.

4. An improved electroyltic water correction device comprising an elongated anode of negative material and having a serpentine groove at least partially over the external surface thereof, a helical cathode of resilient positive material, portions of said cathode in stressed electrical contact with the grooves in said anode, and retaining means about said anode for holding said helical cathode in place in said stressed electrical contact with the grooves of said anode and for adjusting the tension of said cathode.

5. An improved electrolytic water correction device as claimed in claim 4 wherein the retaining means consists of an annular helical cathode ring about each end of the anode in stressed electrical contact therewith and into which the helical cathode within the serpentine groove is connected, said annular helical cathode rings being of a greater helical diameter than the cathode within said serpentine groove.

6. An electrolytic water correction device comprising an anode of negative material, a cathode of resilient positive material wound in a helix having outer surfaces of said helix only in stressed electrical contact with the outer surface of said anode and wherein the axis of said helical cathode is offset from the outer surface of said anode, and means for maintaining the outer surface portions of said cathode in stressed electrical contact with said anode.

7. An electrolytic water correction device comprising an elongated anode of negative material and a cathode of resilient positive material being wound in a primary helix and said primary helix being wrapped in a serpentine secondary helical line about the outer surface along the longitudinal axis of said anode in stressed electrical contact therewith.

8. An electrolytic water correction device comprising an elongated anode of negative material and a cathode of resilient positive material being wound in a primary helix and said primary helix being in stressed electrical contact with said anode about the outer surface of said anode whereby said resilient positive material maintains said cathode in electrical contact with said anode through only outer portions of said helical cathode.

9. An electrolytic water correction device comprising an anode of negative material, and a cathode of positive material in resilient wire form, said cathode being wound in a helix, said helix being wrapped about said anode with outer surfaces only of said helix in resilient stressed electrical contact with said anode.

10. An electrolytic water correction device comprising an elongated core of electronegative metal having a substantially cylindrical exterior surface, said core having a coaxial helical groove formed in said exterior surface, a resilient helical wire coil of electropositive metal seated in said groove with the axis of said coil helically arranged and conforming to said helical groove, the ends of said coil being fixed adjacent the ends of said core, said coil being under tension and in resilient electrical surface contact with said grooved core.

11. An electrolytic water correction device comprising an anode of consumable deformable negative material and a cathode of positive material in resilient wire form, said cathode being wound in a helix, said helix being wound in a serpentine, said helical serpentine being urged against said consumable anode with outer surfaces only of said helix in resilient stressed electrical contact with a surface of said consumable anode to maintain electrical contact therewith during initial swelling and elongation of said consumable anode and during diminution and consumption of said anode.

12. An electrolytic water correction device comprising an anode of consumable deformable negative material, and a cathode of positive material in resilient wire form, said cathode being wound in a helix, means for resiliently urging said helix against said consumable anode with outer surfaces only of said helix in resilient stressed electrical contact with the outer surface of said solid consumable anode whereby to maintain electrical contact therewith during initial swelling and elongation and subsequent diminution due to consumption of said anode incident to the contractile forces of said resilient helical cathode.

13. An electrolytic water correction device comprising an anode of consumable deformable electronegative material, a serpentine helical resilient wire cathode of electropositive material including resiliently expansible and contractible convolutions of said helix in resilient stressed electrical contact at outer portions only of said helix with the external surface of said consumable deformable anode whereby such convolutions will expand and contract conformably to similar expansion and contraction of said anode to maintain electrical contact between cathode and anode.

14. An electrolytic water correction device comprising an elongated anode of consumable deformable electronegative material, a cathode of electropositive material in resilient wire form, said cathode being wound in a helix, said helix being wrapped in a serpentine about said anode, and means associated with said elongated anode and helical cathode to maintain said cathode with outer surfaces only of said helices in stressed electrical contact with said consumable deformable anode during physical changes of said anode in swelling, elongation, diminution and consumption of said anode.

15. An electrolytic water correction device comprising an elongated solid core of consumable deformable electronegative material having a substantially cylindrical exterior surface, said core having a coaxial helical groove formed in said exterior surface, a resilient helical wire coil of electropositive metal seated in said groove with the axis of said coil helically arranged conforming to said helical groove, the ends of said coil being fixed adjacent the ends of said core, said coil being under tension and in resilient stressed electrical surface contact with said groove whereby to maintain electrical contact between said anode and cathode during physical changes of said anode.

16. An electrolytic water correction device comprising an anode of negative material, and a cathode of positive material of resilient wire, said cathode wound in a helix, said helix wound in a serpentine and in stressed electrical physical contact with said anode with outer portions only of said cathode helix in electrical contact with said anode whereby the expandible and contractible properties of said resilient helical serpentine cathode maintain a stressed physical relationship between said anode and cathode.

References Cited in the file of this patent

UNITED STATES PATENTS

| 160,009 | Donoghue | Feb. 23, 1875 |
| 856,361 | Neiburg | June 11, 1907 |
| 1,812,105 | Matzka | June 30, 1931 |
| 2,379,530 | Lederer | July 3, 1945 |
| 2,451,065 | Butler | Oct. 12, 1948 |
| 2,687,996 | Butler | Aug. 31, 1954 |

FOREIGN PATENTS

| 1,013 | Great Britain | Mar. 14, 1878 |